United States Patent
Fasthuber et al.

(10) Patent No.: US 9,632,752 B2
(45) Date of Patent: Apr. 25, 2017

(54) SYSTEM AND METHOD FOR IMPLEMENTING A MULTIPLICATION

(71) Applicants: IMEC, Leuven (BE); Katholieke Universiteit Leuven, K.U. LEUVEN R&D, Leuven (BE); Samsung Electronics Co. Ltd., Suwon-si, Gyeonggi-do (KR)

(72) Inventors: Robert Fasthuber, St. Marienkirchen (AU); Praveen Raghavan, Tamil Nady (IN); Francky Catthoor, Temse (BE)

(73) Assignees: IMEC, Leuven (BE); Katholieke Universiteit Leuven, KU LEUVEN R&D, Leuven (BE); Samsung Electronics Co., Ltd., Gyeonggi-do (KR)

( * ) Notice: Subject to any disclaimer, the term of this patent is extended or adjusted under 35 U.S.C. 154(b) by 331 days.

(21) Appl. No.: 13/721,830

(22) Filed: Dec. 20, 2012

(65) Prior Publication Data
US 2013/0166616 A1    Jun. 27, 2013

Related U.S. Application Data

(60) Provisional application No. 61/578,660, filed on Dec. 21, 2011.

(30) Foreign Application Priority Data

Dec. 21, 2011   (EP) .................................... 11194899

(51) Int. Cl.
*G06F 7/523*   (2006.01)
*G06F 7/533*   (2006.01)
*G06F 9/30*    (2006.01)

(52) U.S. Cl.
CPC ............ *G06F 7/523* (2013.01); *G06F 7/5332* (2013.01); *G06F 9/3001* (2013.01); *G06F 9/30025* (2013.01)

(58) Field of Classification Search
CPC .................................. G06F 7/44; G06F 7/523
(Continued)

(56) References Cited

U.S. PATENT DOCUMENTS 7,257,609 B1 * 8/2007 Kosunen et al. ............. 708/493
2006/0155793 A1   7/2006 Saado
(Continued)

FOREIGN PATENT DOCUMENTS

EP   1866741      7/2009
WO   WO02/33537 A1   4/2002

OTHER PUBLICATIONS

European Search Report, European Patent Application No. 11194899.8 dated Jun. 18, 2012.
(Continued)

*Primary Examiner* — Andrew Caldwell
*Assistant Examiner* — Calvin M Brien
(74) *Attorney, Agent, or Firm* — McDonnell Boehnen Hulbert & Berghoff LLP (57) ABSTRACT

The present system and method relate to a system for performing a multiplication. The system is arranged for receiving a first data value, and comprises means for calculating at run time a set of instructions for performing a multiplication using the first data value, storage means for storing the set of instructions calculated at run time, multiplication means arranged for receiving a second data value and at least one instruction from the stored set of instructions and arranged for performing multiplication of the first and the second data values using the at least one instruction.

17 Claims, 5 Drawing Sheets

(58) Field of Classification Search
USPC ......... 708/490, 495, 503, 620, 625; 717/159
See application file for complete search history.

(56) References Cited

U.S. PATENT DOCUMENTS

| | | | |
|---|---|---|---|
| 2008/0294882 A1* | 11/2008 | Jayapala | G06F 9/325 712/241 |
| 2009/0070394 A1 | 3/2009 | Pu et al. | |
| 2010/0100210 A1* | 4/2010 | Mecchia et al. | 700/94 |
| 2010/0180102 A1* | 7/2010 | Almog et al. | 712/205 |

OTHER PUBLICATIONS

Kosunen, Marko et al., "A Programmable FIR Filter Using Serial-in-Time Multiplication and Canonic Signed Digit Coefficients", Electronics, Circuits and Systems, The 7th IEEE International Conference, vol. 1, Dec. 17-20, 2000, pp. 563-566.

Wang, Yunhua et al., "Interative Radix-8 Multiplier Structure Based on a Novel Real-Time CSD Recoding", 2007 Conference Record of the Forty-First Asilomar Conference of Signals, Systems and Computers, Nov. 2007, pp. 977-981.

Wang, Yunhua et al., "A Multiplier Structure Based on a Novel Real-Time CSD Recoding", 2007 IEEE International Symposium on Circuits and Systems, May 2007, pp. 3195-3198.

Ma, Gin-Kou et al., "Multiplier Policies for Digital Signal Processing", IEEE ASSP Magazine, vol. 7, Issue 1, Jan. 1990, pp. 6-20.

Chen, Chao-Liang et al., "A Simplified Signed Powers-of-Two Conversion for Multiplierless Adaptive Filters", IEEE Int. Symp. on Circuits and Systems (ISCAS), 1996, vol. 2, pp. 364-367.

Mason, George, ECE 645 Lecture 8: Sequential Multipliers, Internet Lecture, http://teal.gmu.edu/courses/ECE645/viewgraphs_S07/lecture8_sequential_multipliers_3.pdf, Jun. 6, 2011, pp. 1-17.

Catthoor et al., Ultra-Low Energy Domain-Specific Instructions-Set Processors, Springer 2010, pp. 323-326 and 331-332.

* cited by examiner

SYSTEM AND METHOD FOR IMPLEMENTING A MULTIPLICATION

CROSS REFERENCE TO RELATED APPLICATIONS

Pursuant to the provisions of 35 U.S.C. §119(b), this application claims priority to EP11194899.8 filed Dec. 21, 2011, the entire contents of which are incorporated herein by reference. The present patent application also claims priority under 35 U.S.C. §119(e) to U.S. Provisional Patent Application Ser. No. 61/578,660, filed on Dec. 21, 2011, the entire contents of which are incorporated herein by reference.

FIELD OF TECHNOLOGY

The present invention is related to the field of implementations for multiplying a multiplier with a multiplicand.

BACKGROUND

Multiplications are part of most digital signal processing algorithms. Often, hardware multipliers contribute significantly to the total energy and area cost of designs. Therefore, especially for the growing market of battery-powered high-volume devices, there is a need to further enhance the energy and area efficiency of multiplier implementations.

A multiplication can be separated in two basic operations, namely the generation of partial products and the accumulation of partial products. In general, multipliers can be distinguished in three main classes: array multipliers, parallel multipliers and iterative multipliers. An array multiplier comprises an array of identical cells which generate and accumulate partial products simultaneously. The circuits for generation and accumulation of partial products are merged. Array multipliers are primarily optimized for maximum speed, while area and energy efficiency is of lesser importance. Because of the high degree of parallelization, array multipliers consume a large area. The practical application of array multipliers is usually limited to high-performance computing.

Parallel multipliers generate partial products in parallel. Contrary to the array multiplier, for the accumulation, a common multi-operand adder is employed. Parallel multipliers are slower than array multipliers, but are typically more area and energy efficient.

Iterative multipliers generate and add the partial products sequentially. For each iteration, the same set of hardware blocks is utilized. Iterative multipliers are characterized by low area, low pin count, short wire length and high clock frequency. The short wire length is also beneficial with regard to technology scaling. Because for a single multiplication the same hardware blocks are typically utilized for several clock cycles, iterative multipliers are generally slower compared to parallel and array multipliers. Mainly due to the overhead in multiple register accesses, traditional iterative multipliers consume typically also more energy than parallel multipliers. However, by reducing the number of iterations, i.e. by making the number of iterations data-dependent, the energy efficiency gap can be greatly reduced.

The cost of a multiplication depends on the number of required partial products. The number of required partial products corresponds to the number of non-zero bits in the multiplier. A coding of the multiplier can reduce the number of non-zero bits and therefore the cost for the multiplication. The most common coding formats are Canonical Signed Digit (CSD), Booth and Signed Powers-of-Two (see for example "*A simplified signed powers-of-two conversion for multiplierless adaptive filters*", Chao-Liang Chen, IEEE Int. Symp. on Circuits and Systems (ISCAS), 1996, vol. 2, pp. 364-367). The CSD format is well known in the art, see e.g. "*Multiplier Policies For Digital Signal Processing*" (Gin-Kou Ma, IEEE ASSP Magazine, vol. 7, issue 1, pp. 6-20, January 1990) and is presented more in detail below. Patent documents like EP1866741 B1 and US2006/155793 also relate to canonical signed digit multipliers.

Multiplications can generally be categorized in constant and in variable multiplications. For constant multiplications, the multiplier is known/fixed at design/compile time. Thus, the recoding (encoding) of the multiplier can be done a priori, i.e. offline. By applying the Dempster-Macleod's algorithm or similar methods, the efficiency can be further improved. In certain applications, such as transposed-form finite impulse response (FIR) filters, a multiplicand has to be multiplied with several constants. Instead of encoding and optimizing each constant separately, a common multiplier block can be generated. This technique, known as Multiple Constant Multiplication (MCM), can additionally reduce the cost significantly. In general, for constant multiplications, a huge optimization potential exists.

For variable multiplications, the multiplier is unknown/not fixed at design/compile time. Therefore, encoding and optimizations have to be carried out in hardware, i.e. on-line. The conversion from two's complement to CSD format can be implemented with look-up tables, with canonical recoding/encoding algorithm or with more complicated digital circuits. Because of the high complexity, optimizations, such as additive or multiplicative factoring, are hardly implemented in hardware. Besides, if only one multiplication with the same multiplier has to be performed, the high cost for applying such optimizations would not be justified. Hence, the optimization potential is lower compared to constant multiplications. Implementing a multiplier with asynchronous techniques can further increase the efficiency.

It is to be noted that it is common in the art to use the same word 'multiplier' to refer either to one of the data values involved in the multiplication (the other one usually being named the 'multiplicand') or to the actual device that performs the multiplication. In this description this convention is followed, as it is always clear from the context in which meaning the word 'multiplier' is used.

Figure 1:
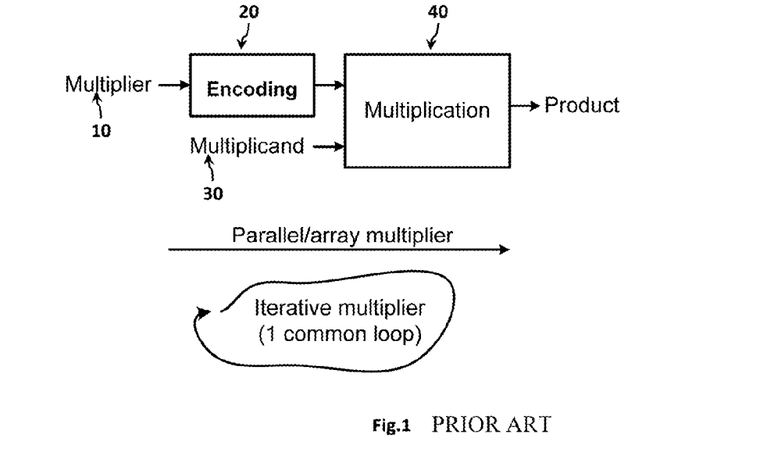
FIG. 1 illustrates a multiplier as known in the art.

FIG. 1 shows a conventional multiplier. In a conventional iterative multiplier, the value of the multiplier is encoded iteratively, i.e. parts of the multiplier are encoded at every iteration. Immediately afterwards, the corresponding output product bits are computed. The encoded multiplier bits are never stored (at least not in a way, so that they are available for reuse in a further multiplication). This means, there is a common loop between the encoding hardware part (20) and the actual multiplication hardware part (40), wherein a previously computed value is fed back to the input of the multiplier (as illustrated with a looped arrow). In a prior art parallel/array multiplier there is no loop (i.e. the straight arrow). Between the encoding block (if present) and the actual multiplication block, a pipeline register may be present. However, this register cannot reuse the value at the subsequent iteration, but it is only used to increase the performance. So for every multiplication both blocks are active.

Traditional hardware multipliers, which operate in a binary system, compute the product with shift-and-add operations. The number of required shift/add operations depends thereby on the number of non-zero bits (=1's) in the multiplier. To reduce the number of non-zero bits, and hence, the cost of the multiplication, CSD coding can be applied. The CSD format extends the binary format by adding the digit '−1'. Hence, a CSD number is represented by a digit set of {1, 0, −1}. The CSD format reduces the number of non-zero bits by replacing strings of 1's with a single '−1'. This means, a series of additions is replaced by a single subtraction. The CSD multiplier hardware needs to support shift-and-add/subtract operations. The CSD format is a radix-two number system. It has the "canonical" property that in two consecutive bits at least one zero bit is present. The probability of a CSD digit $c_j$ being non-zero is given by $$P(|cj|=1)=\frac{1}{3}+(\frac{1}{9}n)[1-(-\frac{1}{2})n] \quad (1)$$

From (1) it can be seen that the number of non-zero bits of a n-bit CSD number never exceeds n/2. Moreover, as the word length growth, the number of non-zero bits reduces to n/3 on average. Compared to a binary number, the maximum number of non-zero bits reduces by 50% and the average number of non-zero bits reduces by 16.67%. The gain of CSD is most significant when long strings of 1's are present in the binary number.

The paper "*A Multiplier Structure Based on a Novel Real-time CSD Encoding*" (Y. Wang et al, 2007 IEEE Intl Symp. on Circuits and Systems, May 2007, pp. 3195-3198) proposes an iterative hardware multiplier that exploits the benefit of CSD coding. However, instead of generating the multiplier in CSD format, the Difference Form Signed (DFS) coding is used. The multiplier is scanned in groups of two bits, therefore maximal n/2 iterations are required (whereby n denotes the number of bits). To reduce the energy in the adder circuit, the adder circuit can be by-passed when zero partial products are detected. However, because the encoding/scanning of the multiplier and the add/sub circuit are directly coupled, the effective number of iterations is unchanged. Furthermore, whenever the add/sub circuit is bypassed, it cannot be reused for performing other operations of the application. The design is a hardware solution where most parameters, such as data path or multiplier word length, are fixed at design time. The paper "*Iterative Radix-8 Multiplier Structure Based on a Novel Realtime CSD Encoding*" (Y. Wang et al, 2007 *Conf. Record of the Forty-First Asilomar Conference on Signals, Systems and Computers*, November 2007, pp. 977-981) proposes a multiplier which has similar characteristics as the aforementioned design. Because it uses radix-8 instead of radix-4, the minimum number of required iterations is reduced. In the prior art an asynchronous iterative multiplier has been proposed, which exploits the multiplier value to avoid unnecessary iterations, leverages on Booth encoding. This proposal is again a hardware solution in which the encoding circuit and the adder circuit are coupled together and the word length is fixed at design time.

Many different multiplier techniques have been proposed in the art. In order to increase the multiplier speed a self-clocked, asynchronous, parallel CSD multiplier has been proposed. Parallel multipliers, which leverage on Binary CSD (BCSD) encoding, are known in the art, as well as parallel multipliers in which the word length is programmable. FIR filters with programmable CSD coefficients have been described and FIR filters where a limited set of CSD coefficients are stored in a look-up table, which can be selected at run time.

In the above-mentioned prior art designs the encoding of the multiplier and the actual computation of the product are coupled in the same control loop. For this reason, the effort of the multiplier encoding and the instruction computation step cannot be reused for other multiplications with the same multiplier. Furthermore, the time for encoding/scanning the multiplier also effects the time for the addition. Hence, there is a need for a solution in which the encoding and the actual multiplication are clearly separated, i.e. wherein they can be executed independent from each other.

SUMMARY

It is an object of embodiments of the present system and method to provide for a solution that allows the reuse of instructions, previously computed at run time, for other multiplications with the same multiplier or delayed use of those instructions.

The above objective is accomplished by the present system and method.

Particular aspects are set out in the accompanying independent and dependent claims. Features from the dependent claims may be combined with features of the independent claims and with features of other dependent claims as appropriate and not merely as explicitly set out in the claims.

A first aspect relates to a system for performing a multiplication. The system is arranged for receiving a first data value and further comprises
  means for calculating at run time a set of instructions for performing a multiplication using the first data value,
  storage means for storing the set of instructions calculated at run time,
  multiplication means arranged for receiving a second data value and at least one instruction from the stored set of instructions and arranged for performing multiplication of the first and the second data value using the at least one instruction.

By providing storage means wherein the instructions computed at run time can be stored for later use or reuse a clear separation between the instruction set computation (and optional multiplier encoding) on the one hand and the actual multiplication with a second data value on the other hand, the instructions remain available for use at a later stage when a multiplication with the same multiplier is to be performed. This can be a reuse of an instruction already used before or a first use but at a later moment, i.e. a delayed use for a multiplication at a "delayed point in time".

In one embodiment, the system comprises a controller means for deciding on the reuse of one or more instructions of the stored set of instructions for performing multiplication of the first data value with a third data value.

As already mentioned, the means for calculating a set of instructions is advantageously arranged for encoding the first data value. By encoding the first data value, i.e. the multiplier, the number of actual operations to be performed while carrying out the multiplication can considerably be reduced.

In one embodiment, the means for calculating has a substantially parallel architecture arranged for computing a sequence of instructions in a single clock cycle. Alternatively the means for calculating has a substantially serial architecture arranged for computing a sequence of instructions in a sequential manner. In further embodiments the means for calculating may have an architecture wherein both parts that operate in parallel and parts with a serial architecture occur.

In one embodiment, the controller means is arranged for selecting from the stored set of instructions, instructions to be executed by the means for multiplication.

In a preferred embodiment, the storage means is arranged for storing a plurality of instruction sets related to a plurality of first data values. Advantageously, the controller means then comprises a comparator to check if the first data value has already been used. If that is indeed the case, instructions for that particular multiplier value that have been stored in the storage means can be reused.

In an advantageous embodiment, the multiplication means is arranged for performing the multiplication of the first and second data value in an iterative way. The at least one instruction received in the means for multiplication, is typically for use in a first iteration.

The means for calculating is arranged for passing the number of iterations to be performed to the controller means. By conveying this information the number of iterations carried out is limited and unnecessary iterations do not need to be executed.

In one embodiment, the set of instructions comprises information on a shift factor, negation bits or the number of iterations to be performed.

Preferably the multiplication means is arranged for representing, as outcome of the multiplication, a resulting data value with a word length smaller than the sum of the word lengths of the first and second data value.

A second aspect relates to a method for performing a multiplication comprising the steps of
receiving a first data value for use in the multiplication,
calculating at run time a set of instructions for performing the multiplication using the first data value,
storing the set of instructions calculated at run time,
receiving a second data value and at least one instruction from the stored set of instructions and performing the multiplication of the first data value with the second data value using the at least one instruction.

In one embodiment the at least one instruction is an instruction that was already used before for a multiplication with the same multiplier. In another embodiment the at least one instruction is used for the first time, but at a later point in time only, hence it is used with a certain delay.

For purposes of summarizing the system and method and the advantages achieved over the prior art, certain objects and advantages have been described herein above. Of course, it is to be understood that not necessarily all such objects or advantages may be achieved in accordance with any particular embodiment. Thus, for example, those skilled in the art will recognize that the subject matter of the present application may be embodied or carried out in a manner that achieves or optimizes one advantage or group of advantages as taught herein without necessarily achieving other objects or advantages as may be taught or suggested herein.

The above and other aspects will be apparent from and elucidated with reference to the embodiment(s) described hereinafter.

BRIEF DESCRIPTION OF THE DRAWINGS

The system and method will now be described further, by way of example, with reference to the accompanying drawings, in which.

DETAILED DESCRIPTION OF ILLUSTRATIVE EMBODIMENTS

The subject matter of the present application will be described with respect to particular embodiments and with reference to certain drawings but the subject matter is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the present application as described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to embodiments of the present application, the only relevant components of the device are A and B.

Reference throughout this specification to "one embodiment" or "an embodiment" means that a particular feature, structure or characteristic described in connection with the embodiment is included in at least one embodiment of the present application. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the present application, various features of the application are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiments requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this application.

Furthermore, while some embodiments described herein include some but not other features included in other embodiments, combinations of features of different embodiments are meant to be within the scope of the present application, and form different embodiments, as would be understood by those in the art. For example, in the following claims, any of the claimed embodiments can be used in any combination.

It should be noted that the use of particular terminology when describing certain features or aspects of the present application should not be taken to imply that the terminology is being re-defined herein to be restricted to include any specific characteristics of the features or aspects of the present application with which that terminology is associated.

In the description provided herein, numerous specific details are set forth. However, it is understood that embodiments of the present application may be practiced without these specific details. In other instances, well-known methods, structures and techniques have not been shown in detail in order not to obscure an understanding of this description.

The present system and method relate to a multiplication system which targets mainly applications that fulfil one of the following two sets of characteristics:

Characteristic Set 1 (cs1):
A1) Many variable multiplications (i.e. multiplications, for which the multiplier value is not known at design/compile time) are required;
B1) The average number of clock cycles (latency) required to perform the actual multiplication, should be kept low;
C1) Most of the variable multiplications are performed with multiplier values having a small word length;
D) Several multiplications with the same multiplier value (i.e., the multiplier value is slowly varying) are required;
E) The full product word length precision is not required;

In this case, typically none of the traditional multiplier types are well suited. Because of feature A1), parallel/array multiplier are preferable (generally more area and energy efficient than iterative multiplier). However, parallel/array multiplier are typically heavily pipelined (to meet performance requirements) and the number of required clock cycles (to compute the output) depends only on the number of consecutive pipeline registers and not on the actual multiplier word length. Thus, the characteristic of C1) cannot be exploited in order to satisfy B1). In traditional iterative multipliers, for which the number of performed iterations is fixed, also B1) and C1) are not optimized. In addition, in none of the existing multiplier solutions, features D) and E) are exploited.

Characteristic Set 2 (cs2):
A2) Very few variable multiplications are required;
B2) Chip area should be kept low;
C2) Low power consumption required;
D) Several multiplications with the same multiplier value (i.e., the multiplier value is slowly varying) are required;
E) The full product word length precision is not required.

Also here, traditional multiplier solutions are not well suited. Because the number of required variable multiplications is very low (A2), parallel/array multipliers are not area efficient (B2). Prior art iterative multipliers, which perform always a fixed number of iterations, are not very energy efficient (C2). In addition, in none of the existing multiplier solutions features are (D) and (E) exploited.

The above mentioned application characteristics are particularly representative of the wireless baseband, the multimedia and the biomedical signal processing domain. For instance, in the wireless baseband domain, low area (feature B2) and power consumption (feature C2) are required. For most multiplications the multiplier value is known at design/compile time. Thus, very few variable multiplications A2) are present. Typically the environment is rather slowly varying (channel conditions, user behaviour), therefore also the multiplier value may slowly vary (feature D)). Since the word length of the data path is rather restricted (to keep area and energy consumption low), mostly only the Most Significant Bits (MSBs) of the product are kept and the Least Significant Bits (LSBs) are discarded (feature E). Application examples of that domain, which fulfil the aforementioned characteristics of the second set, are adaptive filtering, offset compensation, synchronization, MIMO detection etc.

In the present application, the characteristics C1, D and E are exploited in order to increase the efficiency of the multiplication (i.e. to better fulfill B1 and C2). In the prior art, when adding a traditional hardware multiplier to a simple data path, the energy cost of the simple operations increases due to the added multiplexing, the operand isolation and the increased wire length. In contrast, the proposed solution can perform the actual variable multiplication on a general shift-add data path. Therefore, the proposed solution can also be used as an enhancement for an existing processor data path. Since the extension affects mainly the control path, the critical delay of the arithmetic data path does typically not increase.

In the solution according to the present application, the steps of (i) calculating an instruction set and, optionally, encoding the multiplier and of (ii) actually computing the product are clearly separated. Because the output of the first step, i.e. the instruction set computation and encoding, is stored, the effort for the multiplier encoding can be reused later in time for other multiplications with the same multiplier. Also delayed instruction use becomes possible. The output of the first step preferably includes information on how many shift-add/sub iterations are actually required. Therefore the shift-add/sub data path is only used as long as needed. Since the shift-add/sub data path in the present application can be more generic, it can also be used for other operations than multiplications. If the full-precision of the product is not required, the data path can also be narrower. For instance, in combination with a software SIMD data path, the data path word length can be adapted at run time. The proposed solution is well-suited for integration in processor architectures that are based on simple basic operations.

Because of the higher potential of fulfilling the targeted joint requirements of low area and low energy, iterative multipliers to which a multiplier value unknown at design time is applied, is a main application field of the proposed approach. However, other types of multipliers can be considered as well. As compared to parallel and array multipliers, conventional iterative solutions consume significantly more energy. However, several optimizations can be applied, which reduce the average energy consumption of iterative multipliers dramatically.

Figure 2:
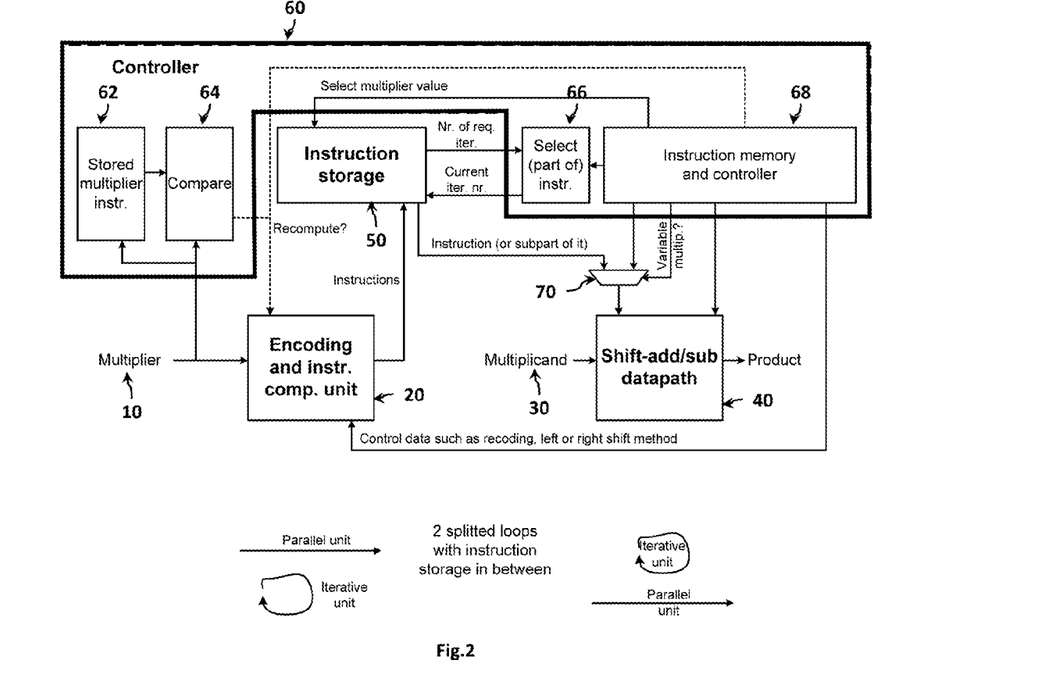
FIG. 2 represents an embodiment of the solution according to the present application.

FIG. 2 illustrates an embodiment of the multiplication system according to an embodiment of the present application. The two main parts are a unit (20) for computing the instructions and a shift-add/sub data path (40) that performs the actual multiplication. In between, an instruction storage block (50) is present. The instruction calculation unit (20) and the shift-add/sub data path can work independently from each other. They can have different loops, i.e. they can operate asynchronously as illustrated at the bottom of FIG. 2.

The instruction computation block takes the multiplier value (10) and optionally performs an encoding (e.g. CSD). Whether encoding is performed or not may be decided at design time (i.e. the general instruction memory and controller (68) contains this information). The encoding is skipped if the multiplier word length is very small (e.g. smaller than 6 bit), otherwise encoding is typically used. Since the multiplier word length is known at design time, this decision can be made offline. After the optional encoding, the shift-add/sub instruction sequence is computed. Typically either the left-shift or the right-shift algorithm is applied. Which one of these algorithms is applied, may also be decided at design time. Typically the right-shift algorithm is used, since it enables the use of a more narrow data path for the actual multiplication (LSB bits one is not interested in, do not need to be computed). One of the differences between the left- and right-shift algorithms is basically the initial multiplicand alignment. In the left-shift algorithm the multiplicand is aligned to the LSB side, while in the right-shift algorithm the multiplicand is aligned to the most significant bit (MSB) side.

The unit (20) wherein a set of instructions is calculated, can be implemented either in a more iterative/sequential manner or in a more parallel manner (see FIG. 2). The serial architecture requires several iterations to compute the full set of instructions. The parallel one can do the same basically in one clock cycle. More details on these implementations are given further on in this description.

After multiplier-dependent instructions have been computed, they are stored in an instruction storage (50). This storage can have memory space for the instructions of one multiplier value or space for the instructions of several multiplier values.

The actual multiplication is performed on the shift-add/sub data path (40), i.e. a data path that supports shifting, addition and optionally subtraction. In a typical embodiment this data path performs the multiplication iteratively. At each iteration the required shift factor and the sign/negation bits are provided from the instruction storage (in which the multiplier-specific instructions are stored). A small control unit (66) takes care that the required parts of the instruction sequence are provided to the data path. It is also possible to use a shift-add/sub data path that can perform several shift-add/sub operations in parallel. For instance, instead of having one shift and one add/sub present, two consecutive shift-add/sub hardware operators can be present. This means, that the actual multiplication can be performed with a lower number of clock cycles (e.g. iteration 1 and iteration 2 are computed in the same clock cycle). In this case, the instructions for two iterations need to be provided concurrently.

The shift-add/sub data path may also be used to execute other operations, so not only variable multiplications. For instance, it can be used to perform constant multiplications. For a constant multiplication the multiplier is known at design time. Therefore, the multiplier encoding and the instruction sequence computation can be done at design time (i.e. it is not necessary anymore to do that at run time). The instruction sequence can then be stored in a general instruction memory (68). FIG. 2 shows a multiplexer (70) between the general instruction memory (68) and the instruction storage (50). So in case a constant multiplication is performed, the shift factors and negation bits are provided from the general instruction memory, in case a variable multiplication is performed, the shift factors and negation bits are provided from the instruction storage (50).

It may be beneficial to store the instruction sequence for not only one, but for several multipliers. Typically at design time it is known, which of the multiplier instruction sequences need to be provided to the data path at which moment of time.

Typically it is known at design time at what time instruction set computation block (20) should be active (i.e. at what time point, the multiplier value changes). However, it is also possible to use a further decision unit (64) to decide, at what time unit (20) should be active. This unit (64) compares the current multiplier value with previously used multiplier values. Only if they are different, the unit (20) for instruction set computation is activated.

Figure 3:
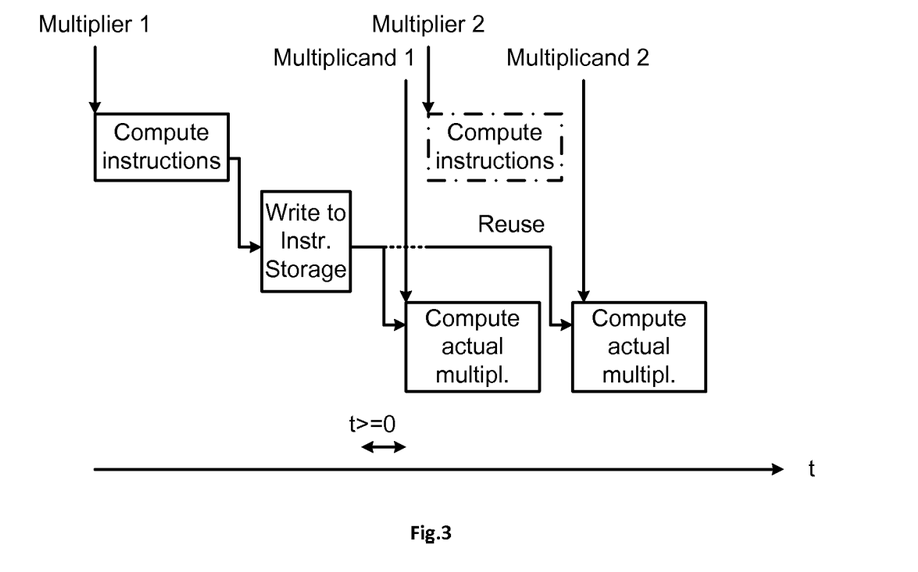
FIG. 3 represents a timeline for a non-interleaved scenario where all instructions are computed before the actual multiplication operation starts.

FIG. 3 shows a timeline for an approach for a non-interleaved case, wherein the unit for instruction calculation and the multiplication means operate independently. For the variable multiplication, first all instructions are computed and then stored. Only after all the instructions have been stored, the actual multiplication on the shift-add/sub data path can start. This second phase can start either immediately once phase 1 is completed, or later in time. As illustrated, if a further multiplication with a new multiplicand is needed (but with the same multiplier as before), the same instruction sequence can be reused. While the actual multiplication on the shift-add/sub data path takes place, the instruction computation unit can already compute the instruction sequence for the next multiplier value. Note, also other operations (=non-variable multiplications) can be computed on the shift-add/sub data path while the instruction computation unit is active.

Figure 4:
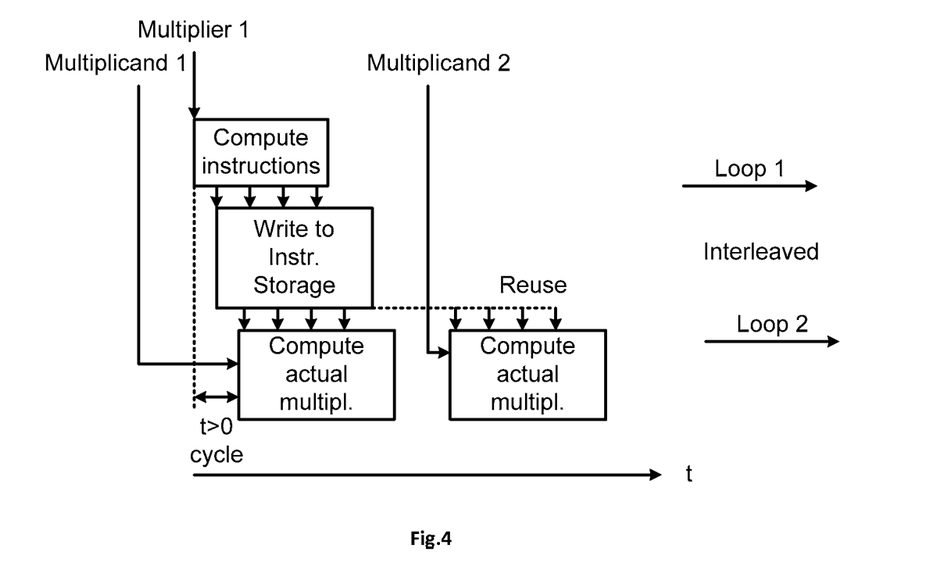
FIG. 4 represents a timeline for an interleaved scenario where only parts of the instructions must have been computed before the actual multiplication operation starts.

In the present application, the instructions computed in phase 1 are stored before they are used in phase 2. In principle, only the instructions for the first iteration need to be stored before phase 2 can begin and not the whole instruction sequence, i.e. not the instructions for all iterations. Because then, one can interleave both loops with e.g. just one clock cycle delay (i.e. the instruction set calculation unit and the actual multiplication means (40) operate in parallel on the same multiplier, but the loop of the second step starts delayed; in this case both units (20) and (40) are iterative). FIG. 4 shows a timeline for that case. As can be seen, phase 2 starts before phase 1 is completed (as shown in FIG. 4, i.e. once at least the first instruction is computed). Hence, the execution of phase 2 is delayed by at least one clock cycle.

Which instructions are actually computed depends on the particular configuration. If the left-shift algorithm is used: the left-shift factor (which depends on the distance between two non-zero bits in the multiplier) and the two negations bits (which depend on whether the considered non-zero bits are binary 1 or minus (only possible in case the multiplier is CSD coded)) for every iteration. If the right-shift algorithm is used: an initial left shift factor+the right shift factors and the negation bits for every iteration. The shift-add/sub data path has generally two data inputs. One data input is the multiplicand, which remains the same for all iterations. The second data input is also the multiplicand for the first iteration, but for all other iterations it is the previously computed output. The data at each of the data inputs can be negated, therefore two negation bits per iteration are needed.

Negation means, that a positive data value (e.g. +4) is converted to a negative value (e.g. −4) or vice versa.

The left and right shift algorithms define for instance, in which order sub-computations have to be performed. As an example, the fact, that the information for the first iteration is coded in the LSB bits of the multiplier, is determined by the algorithm.

Figure 5:
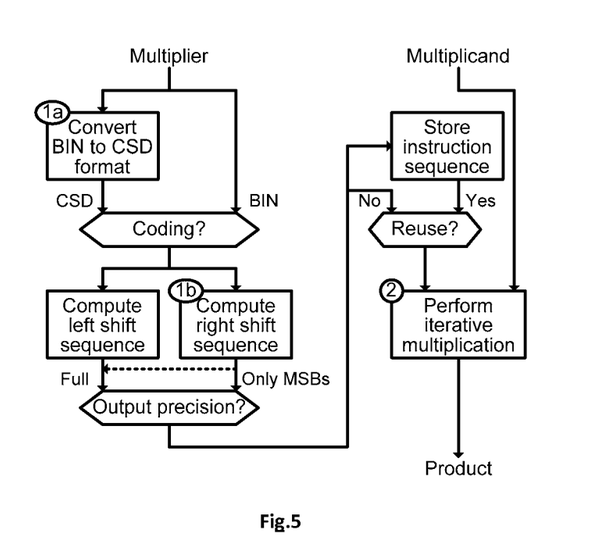
FIG. 5 represents a dataflow of the approach of the present application.

The steps involved in the proposed multiplication method and illustrated in FIG. 5 are now explained with more detail using an example. Thereby a binary to CSD conversion is included and the right-shift method is applied on a narrow data path. The following multiplication (in decimal format) is considered:

$$\text{product} = 7d(\text{multiplicand}) \times 190d(\text{multiplier})$$

The word length of the product, which is also the word length of the data path, is denoted as p. It is assumed to be 8 bit. The word length of the multiplicand, denoted as m, is assumed to be 3 bit.

In step 1a (see FIG. 5), the multiplier is converted from binary to CSD format. Several techniques to perform this encoding have been proposed in the art. Recall however that this CSD encoding is merely an example and that other encoding formats known in the art can equally be applied. Table 1 shows the resulting CSD value of the example. Since the CSD value is represented in signed format, it requires one bit more compared to the unsigned binary representation. The number of Non-Zero (NZ) bits and thus, the number of required iterations has significantly been reduced. This clearly shows the benefit of applying CSD coding.

TABLE 1 binary/CSD representation of the multiplier value 190d and analysis of CSD representation

| Format | Value | Bitwidth | # NZ bits | # iter. |
|---|---|---|---|---|
| Binary | 10111110 | 8 | 6 | 5 |
| CSD | +0-0000-0 | 9 | 3 | 2 |
| Iter. nr. | 2, 1, 0 | | | |
| Dist. +1 | 2, 5, 2 | | | |

In step 1b instructions required for the actual multiplication are computed. The right-shift algorithm is employed for the computation. The algorithm starts with an initial left shift. Afterwards, the required number of iterations is performed. Each iteration comprises a right shift, possible negations and an addition. The multiplication parameters, i.e., the number of iterations, the shift factors and the negation values, are represented in a set of instructions.

Let the number of non-zero bits in the multiplier be denoted as g. The number of required iterations corresponds to g−1. The left shift factor lshf is given by:

$$\text{lshf} = p - m - d_{LSB \ldots 1stnzb} + 1$$

$d_{LSB \ldots 1stnzb}$ corresponds to the distance between the LSB and the first non-zero bit of the multiplier. For the considered example, the left shift factor has the value 3. The right shift factors are determined from the distances between two non-zero bits in the multiplier. Let the distance between two nonzero bits be denoted as $d_{2nzb}$. A right shift factor is given by $d_{2nzb}+1$. For the considered example, two iterations are required. As shown in Table 1, the right shift factors are 5 and 2. In Table 1 the assigned iteration numbers reflect that the algorithm performs the computations from LSB to MSB side of the multiplier. The possible required negations, for both inputs of the addition, are represented in the sign bits of the multiplier. Note, these negations represent the subtractions, which were introduced by the CSD format.

The previously computed instructions can be stored in a small instruction memory. This approach avoids the recomputation of step 1 in case several multiplications are performed with the same multiplier. The actual multiplication is performed on a data path that supports left- and right-shifting, negations and additions. Note, because these basic operations are already supported by most processor architectures, the cost for adopting the proposed approach is typically low. For this reason, the proposed approach is an interesting option for enabling variable multiplications on existing simple arithmetic data path. In traditional multiplier solutions the word length of the data path must be n+m (to accommodate all product bits). However, as already mentioned, for many applications, only the MSBs of the product are required (see the above-mentioned characteristic E). In this embodiment, one can exploit this characteristic to improve the efficiency of the multiplication. Any data path word length, which fulfils the following condition, can be chosen:

$$p \geq m + 1(\text{CSD}) + 1(\text{addition})$$

The area consumption of a data path is proportional to the data path word length and also the energy consumption depends on the employed word length. Hence, by reducing the data path word length (if possible), the area and energy consumption can be reduced. Note, if the shift-add/sub data path supports multiple word length (e.g. SoftSIMD is employed), the considered data path word length can be varied at run time.

Figure 6:
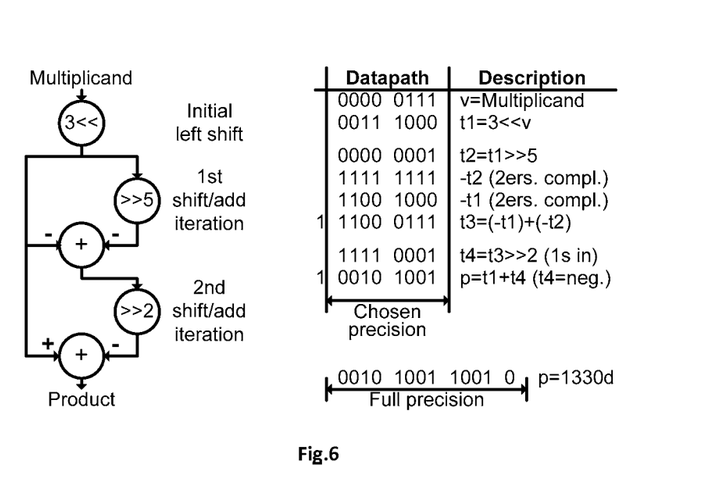
FIG. 6 represents a data flow graph and data path operations.

The Data Flow Graph (DFG) and the corresponding data path operations for the considered example are shown in FIG. 6. The DFG shows the initial left shift and the dataflow for the two iterations. As it can be seen, during the two iterations, only right shifts and addition/subtractions are required. The sign bits next to the adder symbol indicate whether the inputs have to be negated. The data flow is rather regular; therefore it can be efficiently implemented. The table on the right side of FIG. 6 shows the execution of the multiplication on the data path. According to the DFG, the multiplicand is first shifted to the left (=$t_1$). During the first iteration, $t_2$ is shifted to the right and afterwards negated (=−$t_2$). At the same time (in another part of the data path), $t_1$ is also negated (−$t_1$). Then, −$t_2$ and −$t_1$ are added together (=$t_3$). Once also iteration two is completed, the MSBs of the product are available (p). As can be seen by comparing with a full precision data path (i.e. n+m used), despite the narrower data path, the correct product bits have been computed.

As already mentioned, the unit (20) for calculating an instruction set can be implemented either in a more iterative/sequential manner or in a more parallel manner. Some details are now provided for possible implementations of that unit. The architecture of the serial Instruction Computation Unit (sICU) operates in a sequential manner. At every iteration parts of the multiplier are first converted to CSD format and then evaluated. The procedure starts at the LSB side and ends at the MSB side of the multiplier. The evaluation contains a check whether a non-zero bit is present. In case a non-zero bit is found, the evaluation results, i.e. the shift factor and the sign bit, are stored. To obtain the shift factor, a counter, which counts the distance between two non-zero bits, is used. Since this counter is initialized with 1, the counter value represents exactly the shift factor. The number of detected non-zero bits, which contains the information of the number of required shift-add iterations, is captured in a counter register. In CSD format, only maximal one out of two adjacent bits can be non-zero. For this reason, the architecture performs the CSD encoding and the evaluation on a granularity of two bits. To compute the instructions for a n-bit binary multiplier, ceil(n/2) number of iterations are required. The latency for performing a multiplication is given by a) the latency for computing the instructions and b) the latency for performing the actual multiplication on the shift-add data path.

For the multiplication approach proposed in the present application, these two steps are separated. This means, the computation of the instructions has to be completed before the actual multiplication starts. When the serial architecture is employed, both steps are performed iteratively. Therefore, the total maximal latency, which is given by 2×ceil(n/2), is rather high. For certain applications, a high latency is not acceptable. The total latency can be reduced to ceil(n/2)+1 when both steps are performed in an interleaved manner. The 'interleaved manner' means that the first iteration of the actual multiplication step starts immediately after the first iteration of step 1) has finished. To enable this, the iteration number of both steps has to be deterministic and therefore fixed to ceil(n/2). The option, whether the steps should be interleaved or not, is a trade-off between low latency and low energy. In the application the required multiplier word length may vary from multiplication to multiplication. By adjusting the number of iterations, this property can easily be exploited on a granularity of two bits. The serial architecture is a good choice for highly area constrained applications. However, to obtain a higher throughput, a lower latency and lower energy consumption, a more parallel architecture is needed.

Figure 7:
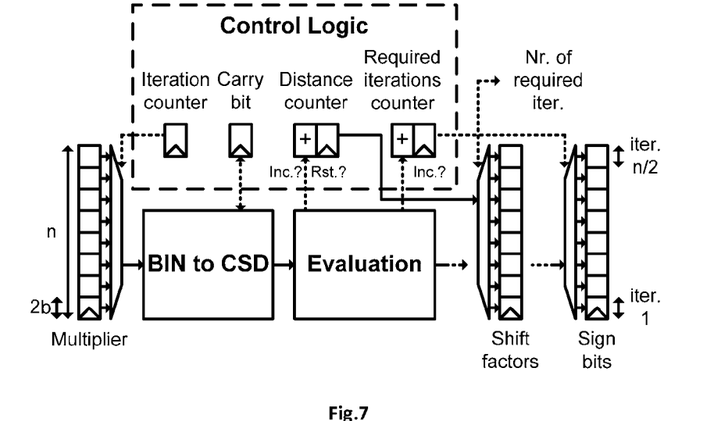
FIG. 7 represents a serial architecture for CSD encoding and instruction computation.
Figure 8:
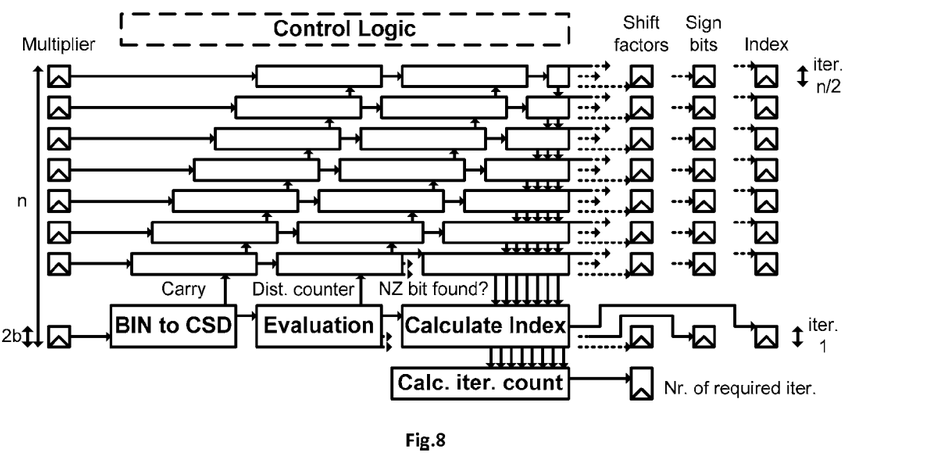
FIG. 8 represents a parallel architecture for CSD encoding and instruction computation.

As shown in FIG. 8, a possible implementation of a parallel architecture, denoted as pICU, performs the CSD encoding and the computation of the instruction sequence in one clock cycle. Similar as the serial architecture, the parallel architecture evaluates the multiplier from LSB to MSB and operates on a granularity of two bits. Each 2 bit row has an individually assigned output register for the shift factor and the sign bit. Therefore, contrary to a serial architecture of FIG. 7, valid output values are not stored in a "compressed" manner. For instance, if row 1 and 3 do contain a non-zero bit but row 2 does not, a "gap" in the output register exists. If the number of shift-add iterations is fixed to the maximum number of ceil(n/2)−1, this is not an issue. However, because the average number of required iterations is lower, fixing the number of iterations to the maximum is not a good solution. Therefore, an indexing approach is implemented, which enables to skip unnecessary iterations. As can be seen in FIG. 8, in the last stage of a row the corresponding index is calculated. For the example above, the index of row 1 would point to row 1, because a non-zero bit is present. However, the index of row 2 would point to row 3, because row 2 has no non-zero bit. Additionally to the index calculation, the number of required iterations is computed. Obviously, the parallel architecture consumes more area than the serial architecture. Nevertheless, it enables supporting the variable multiplication more energy efficiently.

Figure 9:
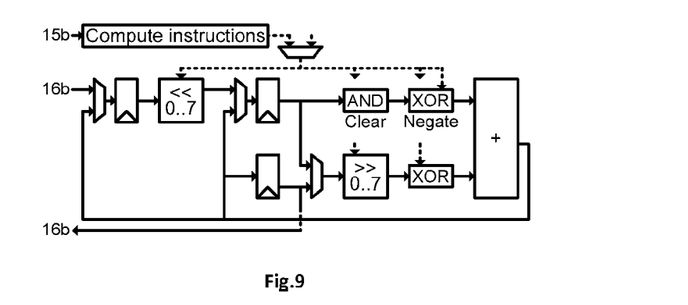
FIG. 9 represents a possible architecture of the multiplication means.

FIG. 9 shows an example of a shift-add data path which is suitable for performing the actual multiplication. The left part of the architecture is used for the initial left shift. The shift-add iterations are performed on the right part of the architecture. Both adder inputs can be negated. The shift factors, the negation control bits and the number of instructions (related to number of iterations) are multiplier dependent. All other control signals can be determined at design/compile time. The architecture of FIG. 9 supports a shift range of 0 to 7. This range is sufficient for a 7 bit multiplier. However, if the multiplier word length exceeds this value, higher shift factors can occur. To solve this issue, several solutions exist. The most straight forward solution is to increase the shift range in the data path. Nevertheless, this measure is expensive because it increases the critical path delay. In addition, since most of the time the wide shift factors are not needed, the average area and energy efficiency is decreased. A more promising solution is to decompose the iterations, which require a wide shift factor, into multiple iterations. Thus, all multiplications, which include only small shift factors, are not influenced. Note, if this decomposition is included, the maximum number of required iterations does not increase. The decomposition can efficiently be implemented in the instruction computation unit. As soon as the distance counter reaches the maximum value of 7, a new iteration is introduced. The proposed method can be a good choice for enabling variable multiplications on existing low-area low-energy processors.

To reduce the energy consumption of a processor that executes a loop-dominated algorithm, the concept of Distributed Loop Buffer (DLB) has been proposed in the literature. A DLB comprises essentially a small instruction memory and a local control. During the execution of a loop, instructions are fetched from the DLB and not from the big L1 instruction memory. This can result in significant energy savings. Note, this concept is typically well-suited for the wireless and multimedia domain, in which algorithms are largely loop-dominated. The content of the DLB is typically determined at compile time.

Figure 10:
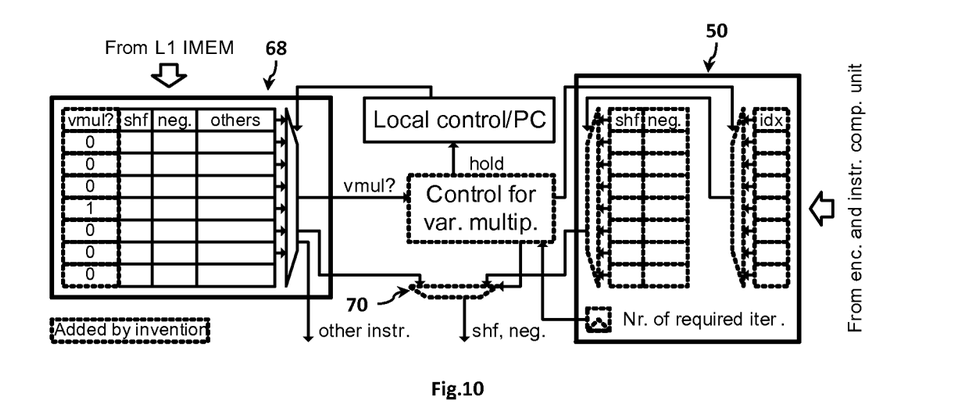
FIG. 10 illustrates a conventional distributed loop buffer extended so that the proposed multiplication method can be supported.

For the following, a DLB is assumed present in the existing control hierarchy of the processor. In FIG. 10, the required extension, for supporting the proposed multiplication solution, is shown. The extension includes the following:

1) an instruction memory (50 in FIG. 2) to store all multiplier specific control data. This memory enables to reuse the computed instruction sequence for multiple multiplications. Depending on the application, it could provide storage for one or for multiple multipliers. As shown, the columns of this instruction memory correspond directly to the outputs of the instruction computation units. The index column, shown on the right side of FIG. 10, is only needed when a parallel instruction computation unit is employed.

2) a column in the DLB memory (68), which indicates when a variable multiplication has to be executed.

3) a control (66) that provides the computed instructions during a variable multiplication sequentially to the data path. As soon as the required number of iterations is performed, the local DLB control takes over again.

In the proposed approach, the actual number of clock cycles required for a variable multiplication is unknown at compile time. Depending on the employed top level control, this indeterminism can be an issue for the synchronization of different DLBs in the architecture. To make the execution deterministic, the control for the variable multiplication can be adapted so that always a fixed number of clock cycles is consumed. During the clock cycles, in which no computations have to be performed, clock gating could be applied.

Figure 11:
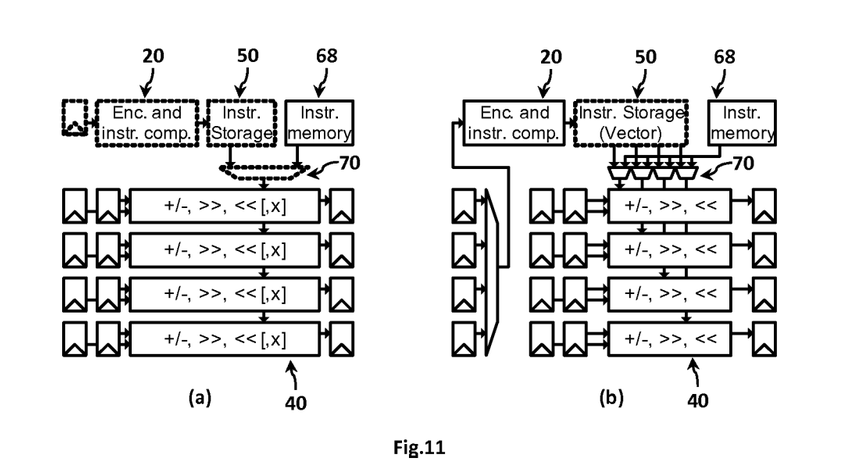
FIG. 11 illustrates parallel architectures with different control support.

FIG. 11(a) shows a traditional four-way Single Instruction Multiple Data (SIMD) data path, where all four SIMD slots are provided with the same instruction. In case conventional hardware multipliers are present, the multiplier for each slot is stored in the individual input register and no control issue exists. However, if the hardware multipliers are replaced with the proposed method, the following limitation exists.

Since all slots share the same control for the shift factors and the negate bits, slots can only perform a concurrent variable multiplication with the same multiplier value. For certain applications, such as adaptive filter or synchronization, this may not cause an issue. In contrary, because of the high reuse factor (≥ number of slots), the efficiency of the proposal is even increased (compared to a single multiplication). Nevertheless, for certain other applications, multiplications with individual multiplier operand are required. To overcome this issue, the data path and the control needs to be adapted in order to support slot-specific control signals for shifting and negation. For a hardware SIMD data path, this extension overhead will be almost negligible: In the data path, the control signals need to be separated. In the control hierarchy, the instruction memory for variable multiplications needs to be duplicated. Note, for all other instructions, still the same SIMD instruction memory can be used. When a software SIMD data path is employed, the overhead may be higher. FIG. 11(b) shows a hardware SIMD data path which supports individual multiplier operands. Depending on the latency and throughput requirements, either one or multiple instruction computation units can be employed. In FIG. 11(b), only one instruction computation unit (20) is present, which is shared amongst all slots.

Because of the storage (50), a time delay between the instruction computation on the instruction computation unit (20) and the multiplication on the shift/add-data path (40) can be introduced. A variable delay between those two steps may help to achieve a better scheduling and as a consequence, a better hardware utilization and a lower area. The benefit of this delay is illustrated on the following example which is based on FIG. 11(b). A four-way vector shift/add-data path and one instruction computation unit, which needs to compute the instructions for all four vector data path slots, is present. To reduce the control cost, multiplications should be performed synchronously on all four vector slots, i.e., all four vector slots start the multiplication at the same time. All four vector slots can operate on different data, this means they can also have an individual multiplier value. Since only one instruction computation unit is present, the instruction computation unit needs to be activated four times to compute the instructions for all four vector slots.

Once the instructions for all four vector slots/multiplier values have been computed, the synchronous multiplication on the vector slots can start. As can be noticed, there is a delay between the computation of the first instruction, i.e. the first activation of the instruction computation unit, and the start of the multiplication. If this delay would not be enabled, either also four instruction computation units would be necessary (area overhead) or the four vector slots could not operate synchronously (control overhead).

While the system and method have been illustrated and described in detail in the drawings and foregoing description, such illustration and description are to be considered illustrative or exemplary and not restrictive. The foregoing description details certain embodiments. It will be appreciated, however, that no matter how detailed the foregoing appears in text, the subject matter of the present application may be practiced in many ways. The present application is not limited to the disclosed embodiments.

Other variations to the disclosed embodiments can be understood and effected by those skilled in the art in practicing the claimed embodiments, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for performing a multiplication, the system comprising a controller, wherein the controller comprises:
   a decision unit configured to determine whether a first data value has been used in a prior multiplication;
   a distributed loop buffer (DLB) configured to store instructions; and
   at least one processor, wherein the at least one processor is configured to execute the instructions so as to carry out operations, the operations comprising:
   receiving the first data value used in the prior multiplication;
   at run time and responsive to receiving the first data value, determining a sequence of shift-add/sub instructions for performing a multiplication using the first data value, wherein at least one instruction from the sequence of shift-add/sub instructions comprises a subtraction instruction;
   responsive to determining the sequence of shift-add/sub instructions, storing the sequence of shift-add/sub instructions in the DLB;
   receiving a second data value; and
   performing a multiplication using the first data value, the second data value, and at least one instruction from the stored sequence of shift-add/sub instructions.

2. The system for performing a multiplication as in claim 1, wherein the operations further comprise deciding on reuse of one or more instructions of the stored sequence of shift-add/sub instructions for performing a multiplication of the first data value with a third data value.

3. The system for performing a multiplication as in claim 1, wherein the operations further comprise encoding the first data value.

4. The system for performing a multiplication as in claim 3, wherein the at least one processor has a parallel architecture arranged for computing the sequence of shift-add/sub instructions in a single clock cycle.

5. The system for performing a multiplication as in claim 3, wherein the at least one processor has a serial architecture arranged for computing the sequence of shift-add/sub instructions in a sequential manner.

6. The system for performing a multiplication as in claim 3, wherein the operations further comprise selecting, from the stored sequence of shift-add/sub instructions, instructions to be executed by the at least one processor, wherein the selecting is based at least in part on the first data value.

7. The system for performing a multiplication as in claim 3, wherein the DLB is arranged for storing a plurality of sequences of shift-add/sub instructions that correspond to a plurality of first data values.

8. The system for performing a multiplication as in claim 3, wherein performing the multiplication of the first and the second data values comprises an iterative multiplication.

9. The system for performing a multiplication as in claim 8, wherein the at least one processor is arranged for determining a number of iterations to be performed in the iterative multiplication, wherein determining the number of iterations is based on the first data value and the corresponding sequence of shift-add/sub instructions.

10. The system for performing a multiplication as in claim 8, wherein the at least one instruction is for use in a first iteration of the iterative multiplication.

11. The system for performing a multiplication as in claim 3, wherein the sequence of shift-add/sub instructions comprises information on a shift factor, negation bits, or a number of iterations to be performed.

12. The system for performing a multiplication as in claim 3, wherein the operations further comprise representing, as an outcome of the multiplication, a resulting data value with a word length smaller than a sum of word lengths of the first and the second data values.

13. The system for performing a multiplication as in claim 3, wherein encoding the first data value comprises encoding the first data value according to a canonical signed digit (CSD) representation.

14. The system for performing a multiplication as in claim 1, wherein the decision unit is configured to determine an instruction reuse condition, wherein the instruction reuse condition comprises the first data value being used in a prior multiplication, wherein determining the sequence of shift-add/sub instructions is performed in response to determining the instruction reuse condition, and wherein the multiplication is performed using at least one instruction from the stored sequence of shift-add/sub instructions related to the first data value used in the prior multiplication.

15. A system for performing a multiplication, the system configured to receive first and second data values, comprising:
    an instruction calculation unit that determines at run time a sequence of shift-add/sub instructions for performing a multiplication using the first data value, wherein at least one instruction from the sequence of shift-add/sub instructions comprises a subtraction instruction;
    an instruction storage block, interconnected to the instruction calculation unit, that receives and stores the sequence of shift-add/sub instructions determined at run time, wherein the instruction storage block comprises a distributed loop buffer (DLB);
    a decision unit configured to compare the first data value or the second data value with previously used data values and determine an operational state of the instruction calculation unit based on the comparison; and
    a multiplier, interconnected to the instruction storage block, that receives at least one instruction from the stored sequence of shift-add/sub instructions and the second data value, and responsively performs multiplication of the first and the second data values using the at least one instruction.

16. The system for performing a multiplication as in claim 15, wherein the instruction calculation unit and the multiplier are configured to operate asynchronously.

17. The system for performing a multiplication as in claim 15, wherein the multiplier is configured to perform at least one of: a variable multiplication or a constant multiplication.

* * * * *